(12) United States Patent
Northcutt

(10) Patent No.: US 6,554,880 B1  
(45) Date of Patent: Apr. 29, 2003

(54) ADJUSTABLE AIR DIFFUSER AND RELATED METHODS

(76) Inventor: David T. Northcutt, 14 Foxcrest, Irvine, CA (US) 92620

( * ) Notice: Subject to any disclaimer, the term of this patent is extended or adjusted under 35 U.S.C. 154(b) by 0 days.

(21) Appl. No.: 09/718,900

(22) Filed: Nov. 22, 2000

(51) Int. Cl.[7] .............................................. B01D 29/05
(52) U.S. Cl. ...................... 55/385.2; 55/385.1; 55/481; 55/484; 55/506; 55/DIG. 29; 55/DIG. 31; 55/DIG. 35; 454/292; 454/298; 454/324
(58) Field of Search .................. 55/385.1, 385.2, 55/481, 484, 506, DIG. 31, DIG. 35, DIG. 29; 454/292, 298, 324

(56) References Cited

U.S. PATENT DOCUMENTS

| | | |
|---|---|---|
| 3,690,243 A | 9/1972 | Lambert |
| 3,699,871 A | 10/1972 | Larkfeldt |
| 3,757,667 A | 9/1973 | Lambert |
| 4,231,253 A | 11/1980 | Ohnhaus et al. |
| 4,231,513 A | 11/1980 | Vance et al. |
| 4,375,183 A | 3/1983 | Lynch |
| 4,417,687 A | 11/1983 | Grant |
| 4,506,828 A | 3/1985 | Grant |
| 5,564,975 A | 10/1996 | Northcutt |
| 5,837,022 A * | 11/1998 | Chapman ................ 55/DIG. 31 |
| 5,964,910 A * | 10/1999 | Keele ........................ 55/385.2 |
| 6,030,427 A * | 2/2000 | Sorice et al. ........... 55/DIG. 35 |
| 6,126,708 A * | 10/2000 | Mark et al. ............. 55/DIG. 35 |
| 6,241,794 B1 * | 6/2001 | Jadran et al. ........... 55/DIG. 35 |

OTHER PUBLICATIONS

Two pages of printout from website http://www.warrenhvac.com/validair.htm printed on Nov. 3, 2000 regarding Warren Technology entitiled "UNI–GUARD High Efficiency Individual Room Air Filtration System".

Copy of brochure from Warren Technology entitled, "UNI–GUARD High Efficiency Individual Room Air Filtration System" with Copyright date of year 1999.

Copy of a postcard mailed to Mr. Northcutt of AES Industries High Performance Drop Box.

* cited by examiner

Primary Examiner—David A. Simmons  
Assistant Examiner—Minh-Chan T. Pham  
(74) Attorney, Agent, or Firm—J. Mark Holland

(57) ABSTRACT

Apparatus for a discharge vent on an air circulation system includes structures for controlling the direction and quantity of airflow. Filter elements may be provided to help reduce contaminants that might otherwise be discharged through the vent. Preferred methods for assembling and using the apparatus are disclosed.

16 Claims, 5 Drawing Sheets

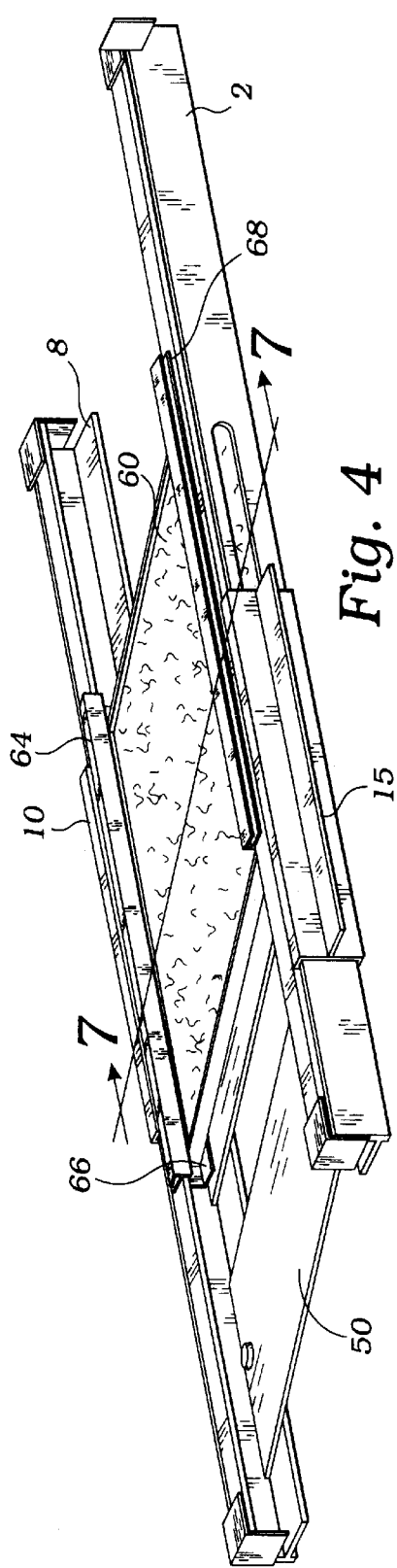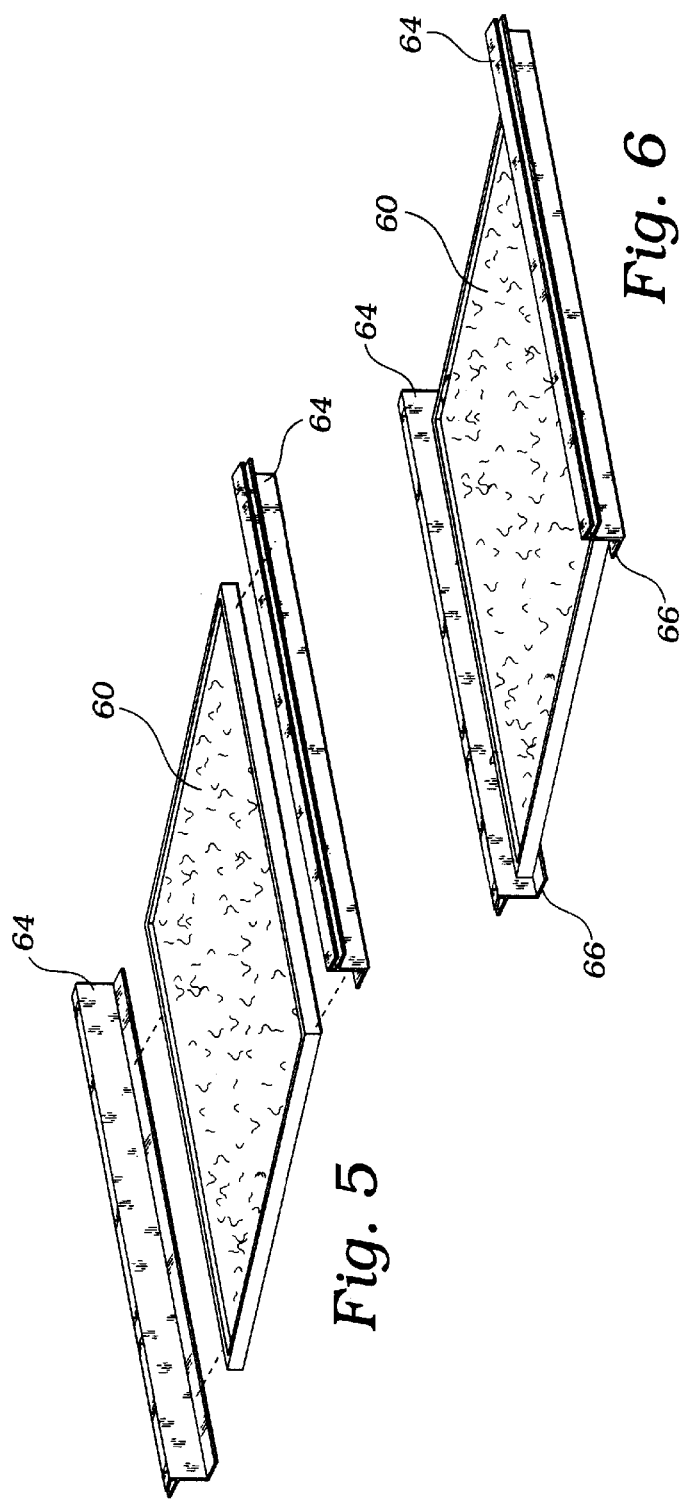

ADJUSTABLE AIR DIFFUSER AND RELATED METHODS

The present invention relates to an apparatus for regulating air and removing contaminants from air discharge vents, such as those used for air conditioning or heating systems.

BACKGROUND OF THE INVENTION

Central heating and air conditioning systems typically include ducts to distribute processed (heated or cooled) air. These ducts distribute heated or cooled air from the source units (either a heater or air conditioner). In many office buildings and similar environments, the ducts are positioned above suspended ceilings and are configured to discharge the treated air through spaces that would otherwise be filled with removable ceiling panels.

Vents or grilles of various configurations may be positioned at these discharge "panel" locations. Much of the background and relevant problems associated with those vents or grilles are discussed in my U.S. Pat. No. 5,564,975 for AIR FLOW CONTROLLER FOR HEATING AND AIR CONDITIONING VENTS.

Although my invention of U.S. Pat. No. 5,564,975 addresses many of the shortcomings of the prior art, further refinements and other approaches discussed below provide alternatives that may be beneficial in some or many installations.

In addition, even for systems that may provide some airflow adjustability for the convenience and comfort of the occupants, most discharge vents do not have air filters to filter out dust, bacteria or other contaminants. Where filters are used, it is more common to find them on air returns or air handlers, which typically feed air to the intake side of air conditioning or heating units. While such filtering is helpful, the filters sometimes can be difficult to service and in any case cannot do anything to reduce contamination that may exist or be generated within the ducting system itself. Thus, dust or other contaminants in the duct or generated by the heater/air conditioner are commonly blown onto occupants or back into the buildings, rather than being filtered out.

Part of the problem associated with air ducts relates to moisture that occurs naturally as part of the heating/air conditioning process. Typically in air conditioning systems, when air is cooled, some of the moisture condenses along the walls of the ducts. That moisture not only causes dust and other things to accumulate along the ducts, but permits and enables microscopic growths to appear and accumulate (such as mildew, fungus, bacteria and other microbial particles). The typical air filter at the system return/intake does nothing to stop the system from blowing these potentially harmful microbes onto occupants of the building.

Warren Technology's Uni Guard™ individual room air filtration system addresses some of those concerns but has several shortcomings. Among other things, its diffuser provides a limited range of control flexibility, and replacing its filter typically requires removing one or more adjacent ceiling tiles, which typically is at least somewhat inconvenient and time consuming.

My U.S. Pat. No. 5,564,975 likewise addresses some of the foregoing issues, but is somewhat limited as to the "degree" of airflow control it provides. Moreover, it does not address the contaminants issue.

Other prior art patents (such as U.S. Pat. No. 3,690,243 to Lambert, U.S. Pat. No. 3,757,667 to Lambert, U.S. Pat. No. 4,506,828 to Grant, U.S. Pat. No. 4,417,687 to Grant, U.S. Pat. No. 4,375,183 to Lynch, Reissue patent 30953 of U.S. Pat. No. 4,231,513 to Noll et al., U.S. Pat. No. 4,231,253 to Faith et al., and U.S. Pat. No. 3,699,871 to Larkfeldt) have similar shortcomings. In addition, the devices in those patents typically are not easy to install or easy to use, and commonly are more expensive to produce and/or install and maintain. In addition, they do not teach nor contemplate using filter elements.

An effective solution should not only address the foregoing flow and contaminants issues, but should also be easy to use and replace, be reasonably priced, and be provided for both retrofits and new installations.

OBJECTS AND ADVANTAGES OF THE INVENTION

Accordingly, it is an object of the present invention to provide an improved air flow controller for heating and air conditioning vents.

It is a more particular object of the present invention to provide a vent with multiple flow paths wherein each individual flow path may be separately regulated.

It is another object of the present invention to provide an air flow controller with vent flow paths that are easy to manipulate.

A further object of the present invention is to provide a vent with flow paths that can be adjusted from a distance when using a stick or similar reaching apparatus.

Yet another object of the invention is to provide a vent with filter elements for removing contaminants.

A still further object of the present invention is the provision for allowing filter elements to be readily replaced, such as without having to move or remove any adjacent ceiling tiles.

Other objects and advantages of the invention will be apparent from the following specification and the accompanying drawings, which are for the purpose of illustration only.

BRIEF DESCRIPTION OF THE DRAWINGS

FIG. 4 is an isometric view of a preferred embodiment separate from the suspended ceiling structure and including a filter element.

FIG. 5 is an exploded view of an alternative view of a filter element assembly useful in the invention, similar to the filter assembly portion of FIG. 4 except for the cross-sectional shape of the mounting brackets.

FIG. 6 is similar to FIG. 5, but shows the assembly of FIG. 5 in an isometric view with the filter element seated within the mounting brackets.

8 installed in a preferred support structure, as it might appear when the lower portion is hinged downwardly to permit replacement of filters or other service.

DESCRIPTION OF PREFERRED EMBODIMENT

The drawings illustrate a preferred embodiment of the invention, including an improved air flow controller 1. Preferably, the components of the air flow controller 1 are fabricated from suitably strong, lightweight materials to provide reliable service in an air exhaust system and are easy to transport and install. Many of the components may be fabricated by injection molding, blow molding, extruding plastic, or similar processes. In embodiments using separate components to complete the assembly, that assembly of various pieces to each other may be accomplished by any suitable means, including without limitation gluing, welding, screws, etc. Preferably, most of the mechanical components of the invention are extruded from plastic, injection molded from glass-filled reinforced nylon, or fabricated by some similar process, including (without limitation) using extruded aluminum or other metal. Persons of ordinary skill in the art will understand that the invention may be effectively practiced with a wide variety of materials and fabrication methods.

Figure 1:
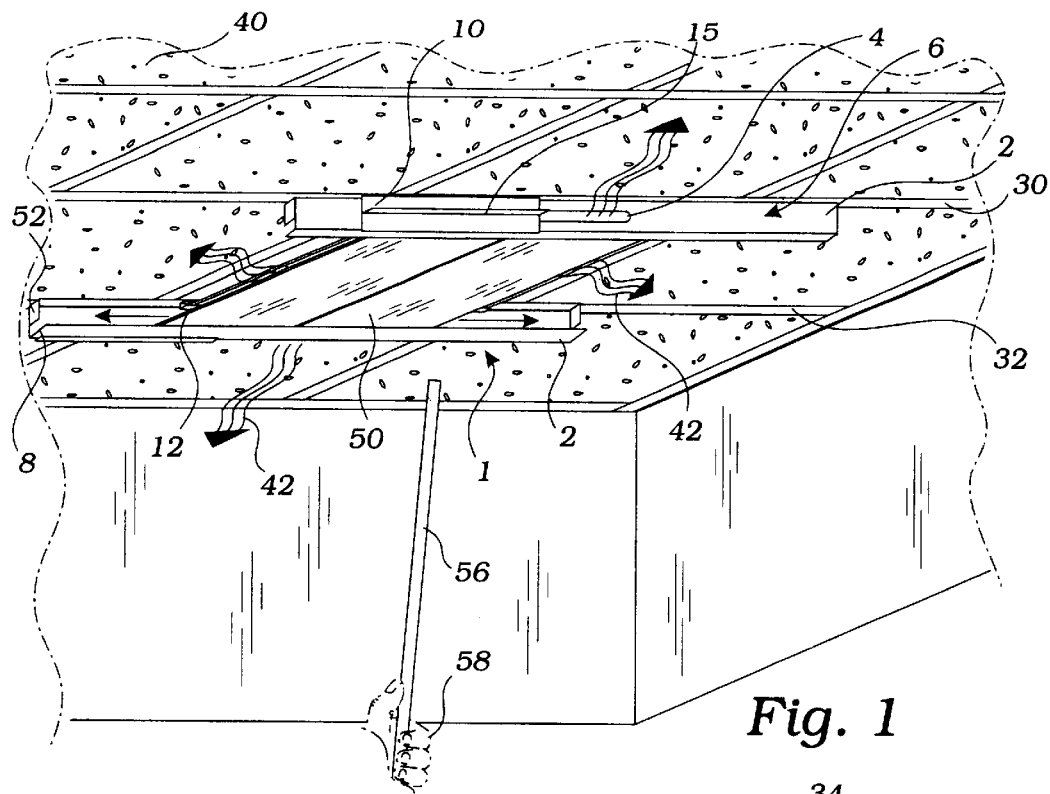
FIG. 1 is an isometric view of a preferred embodiment of the invention, as installed on a suspended ceiling and with the side vents in a partially open position.

As mentioned above, much of the background associated with suspended ceiling and related vents or grilles are discussed in my U.S. Pat. No. 5,564,975, the disclosures of which are incorporated herein by reference. In FIG. 1 of the present document, the preferred apparatus 1 includes a pair of elongated channels or rails 2, each having a side 6 surface that is machined or fabricated to include a regulating vent or rail slot 4. The regulating vent or rail slot 4 is preferably an elongated opening in the side 6 of the channel 2. However, persons of ordinary skill in the art will understand that the regulating vent 4 can be of any of a wide variety of configurations and dimensions and numbers of holes in the side 6, so long as the structural integrity of that channel 2 is not compromised. In their open position (see FIG. 1), the preferred regulating vents 4 on each of the channels 2 provides a first pair of flow paths within a first flow plane 42.

In the preferred embodiment, the apparatus 1 is installed in a suspended tile ceiling or hanging ceiling. The preferred connection of channels 2 to the ceiling is further discussed below regarding FIG. 7. In general, a series of ceiling rails or ceiling splines (30, 32, 34, and 36) in the shape of T-bars are suspended on cables attached to a higher ceiling (not shown). The ceiling rails, (sometimes referred to herein as just "rails"), typically have seating surfaces (their T portion), whereby ceiling tiles seat. Lights, air ducts, air vents and other fixtures may be hung within the T-bar framework provided by the rails but those elements typically terminate above the T-bar rails. The preferred embodiment of apparatus 1 is suspended from the rails but protrudes below the rails. Although T-bars are discussed herein, ceiling rails with other cross-sections can be used in practicing the invention.

Figure 7:
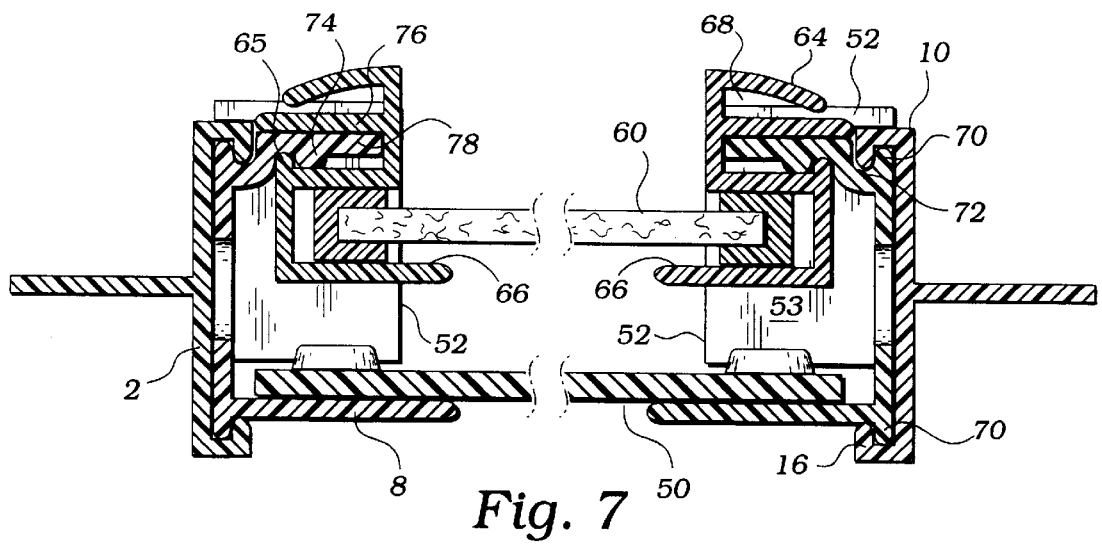
FIG. 7 is a foreshortened cross-sectional view along reference line 7—7 of FIG. 4.

Preferably, each of the elongated channels 2 is fixedly connected to one of the parallel ceiling rails 30 and 32 via one or more clips 68 (see FIG. 7 and related discussion below). Alternatively, and where ceiling rails are difficult to get to or are not used (such as the case with plaster ceilings and seamless ceiling tiles), the apparatus can be attached using screws, double sided tape, or similar methods. In the preferred assembly process, the support brackets 64 are first attached to the channels 2. The channels are then mounted onto the ceiling rails 30 and 32, and then other components may be assembled to form the overall apparatus 1. As shown in FIG. 1, the apparatus 1 includes a pair of slidable (deflector) panels 50 and a pair of slidable dampers 10. The slidable panels 50 are slidably positioned along the lower half of the elongated channels 2, the lower lip 8 (see also FIG. 4), and serve as regulators for another of the air flow paths 46 (illustrated as generally downward). The slidable dampers 10 preferably are in a tongue and groove engagement with the elongated channels 2 and serve as the regulators for the first pair of regulating vents 4. The preferred manner and way in which the dampers 10 and panels 50 are connected to the elongated channels 2 are further discussed below in FIG. 7.

When the slidable panels 50 are in the closed position, as shown in FIG. 1, or otherwise partially block the flow of air along path 46, air flow is diverted along the first plane 42 not only towards and through the vents 4 (if those are uncovered as explained herein), but also may be diverted through a second pair of vents 12 formed by the space between the panels and the tile ceiling 40. In the preferred embodiment, vents 12 are not provided with separate covers but instead remain "open" at all times.

When the panels 50 are in the closed position and the slidable dampers are in the open position, as shown, exhaust air from the air duct flows along plane 42, out of the first pair of regulating vents 4 and the second pair 12. In this configuration, air flow may be regulated along plane 42 by sliding the dampers 10 along the tongue and groove race and the slidable panels along the seat of the elongated channels 2. By covering the vents 4 partially or totally, more or all of the flow in plane 42 can be forced out the aforementioned spaces between the panels 50 and the ceiling 40.

Figure 2:
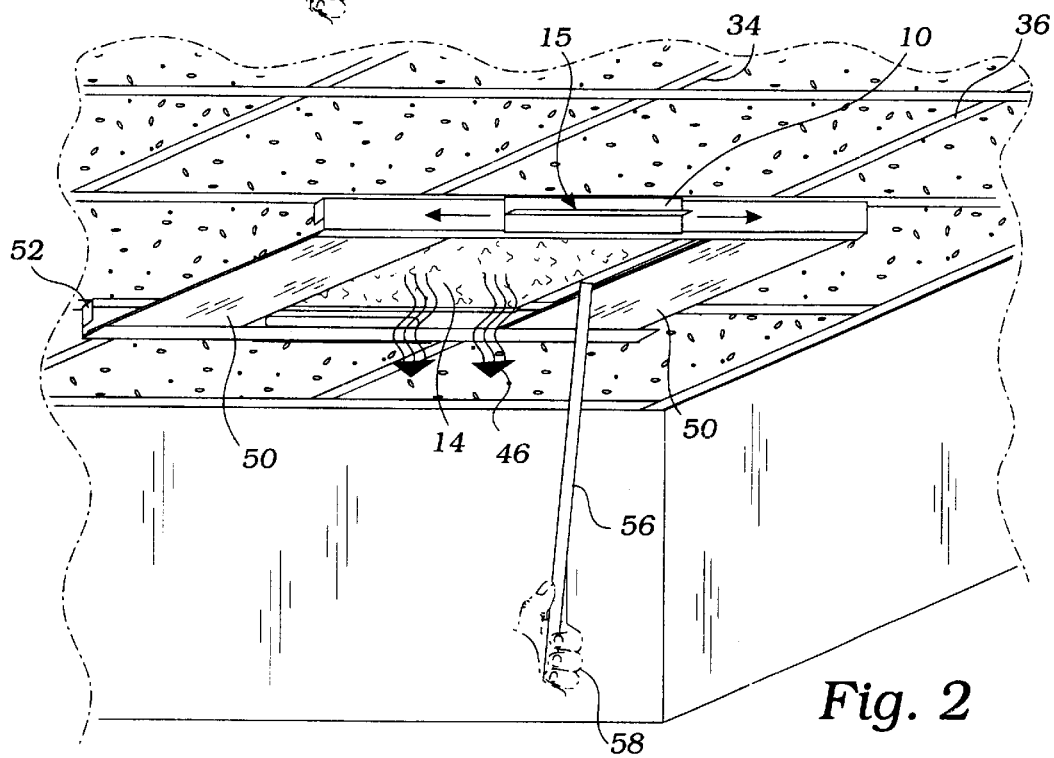
FIG. 2 is similar to FIG. 1, but illustrates the lower deflector panels in an open position and the side vents in a closed position.

If instead, an occupant wishes to direct some or all of the flow downwardly, this can be achieved by sliding the panels 50 away from their "closed" position, FIG. 2, illustrated as being centered under the air duct opening. When that is done, some or all of the center regulating vent 14 is exposed, thereby allowing air flow to flow downwardly therethrough, in direction 46. In the preferred embodiment, two of the sides of the center regulating vent 14 are generally formed by the elongated channels 2, and the other two sides by the edges of the slidable panels 50 (depending on whether those edges underlie the air flow path). In certain installations and applications, when slidable panels 50 are fully opened, the interior edges of the panels 50 may be outside the air flow path, so that the edges of the ceiling rails 34 and 36 or some other structure delimits the other two sides of the center regulating vent 14. As indicated above, air flow through regulating vent 14 is in the direction of arrow 46, FIG. 2.

The particular flow path of air (through the combination of vent 14, vents 4, and vents 12) depends on a number of factors, including the air pressure at the duct, the settings of the various panels 50 and slides 10, etc. Persons of ordinary skill in the art will understand that the relative size and number of slidable panels 50 and dampers 10 can be any of a wide selection, to provide additional fine-tuning to the flow control achievable with the invention. Likewise, the size and position of the other components may vary depending on the particular application and range of use desired.

In the preferred embodiment, the panels 50 are fabricated with a clear translucent material. One of the reasons for this preferred embodiment is occasionally the apparatus 1 is placed next to or near a set of ceiling lights. If slidable panels 50 are moved to the open position, as shown in FIG. 2, the panels 50 may obstruct the paths of the ceiling lights (if those are adjacent to the apparatus 1), unless the panels 50 are of a translucent material, in which case, the lights simply illuminate on through.

Adjusting and positioning the slidable panels 50 and the slidable dampers 10 to regulate air flow can be done in any suitable manner. In the preferred embodiment, for example, an individual 58 can pick up a stick or other elongated rod-like member 56 and easily move the panels 50 and dampers 10 to any desired combination of positions. The apparatus 1 is preferably fabricated with materials and within dimensional tolerances such that the panels 50 and the dampers 10 can be move with minimal force. Preferably, fins 15 are provided on each of the dampers 10 to serve as leverage points for the occupant's stick 56 when the occupant 58 manipulates the dampers 10.

Figure 3:
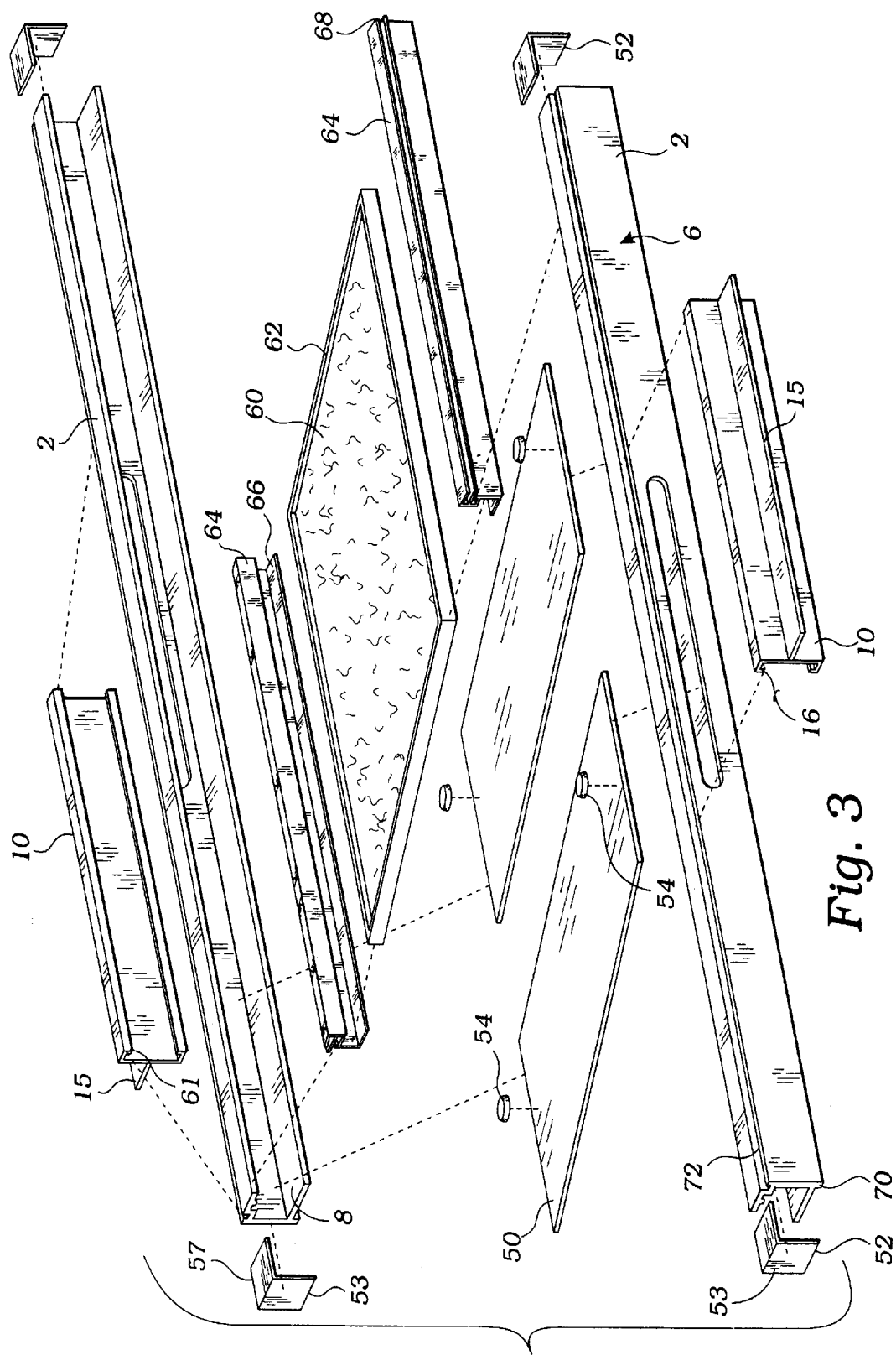
FIG. 3 is an exploded view of the embodiment of FIGS. 1 and 2, including a filter element.

Further details of the preferred embodiment are illustrated in FIG. 3. The elongated channels 2 are fabricated with several tongues and grooves, e.g., 70 and 72, to which other components may be engaged. Preferably, the ends of each of the elongated channels 2 include stop members 52. In the preferred embodiment, the stop members 52 are L-brackets or angle brackets, and are connected to the ends of the channels 2 using general bonding agents or glue. However, those person of ordinary skill in the art will understand that any other suitable method (including, by way of example, screws or rivets or sonic welding) may be used without departing from the invention.

Among other things, the stop members 52 provide a stop point for the sliding dampers 10 and panels 50. The preferred dampers 10 include a downwardly protruding tongue element 61, FIG. 3, which interferingly contacts the stop members 52 to prevent it from being slid off the channel 2. Similarly, the stop members 52 act to stop the panels 50 from being slid out of engagement with the assembly 1, via the preferred stop tabs 54 (see FIG. 3) affixed to or formed on the panels 50 that interferingly contact the downwardly extending portions 53 of the stop members 52. The stop members 52 ensure that when the panels 50 and the dampers 10 are moved to the open position, they are not accidentally disengaged from the elongated channels 2.

In the preferred embodiment, the apparatus 1 includes a pair of support brackets 64. The preferred support brackets 64 have at least two functions: to support the filter element 60 (preferably by it resting on the inwardly extending portions 66) and to attach the entire apparatus 1 onto the T-bars of the ceiling rails 30 and 32, using the clip portions 68. For this latter function, the support brackets 64 preferably act as mounting means. The support brackets 64 can be provided in any convenient length, and multiple shorter pieces (rather than a single long continuous piece 64) can be used where necessary or desired. As further discussed in connection with FIG. 7, the preferred support brackets 64 use a tongue and groove 65 and 74 engagement with the elongated channels 2.

Although various embodiments of the invention may be practiced with no filter element, and although a wide variety of filter can be effectively used in the invention, the preferred filter element 60 is of a woven type surrounded by mesh metal frames and a cardboard perimeter 62 as bonding agent, as often found in a local hardware store. The cardboard edges must be sufficiently narrow to seat along the support channels 66 of the support brackets 64. In an alternative embodiment, not shown, the filter element 60 comes in two or more separate pieces. Each piece consists of a metal frame, similar to three rectangles back-to-back-to-back, enwrapped by fiber materials. Persons of ordinary skill in the art will understand that as filter technology changes and improves, different filters may be used without deviating from the spirit of the invention.

FIG. 4 depicts a fully assembled apparatus 1 separate from the preferred suspended ceiling structure. The preferred embodiment of apparatus 1 does not include lateral connections (other than the aforementioned suspended ceiling rails) to hold the elongated channels 2 in position, as shown, and to form a rectangular frame. This helps reduce cost and weight, and simplifies installation. Persons of ordinary skill in the art will understand that, for certain applications, lateral supports (such as two additional perpendicular channels) can be utilized without deviating from the spirit of the invention.

In the preferred embodiment, the stop members 52 are glued to the ends of the channels 2 at the factory. In other words, they are shipped with the stop members 52 bonded in their respective positions. Alternatively, the stop members can be shipped separately and glued by the end users. This gluing can take place before or after the dampers 10 and support brackets 64 are engaged with the channels 2 (via the various tongues and grooves). Each channel 2 is then clipped into position by snapping clip member 68 over the T of the ceiling rail. Thus, support brackets 64 are preferably first installed onto the channels 2 before the channels are installed onto the ceiling rails. After both channels 2 are clipped in position, they hang along the ceiling by the clip members 68. The ceiling rails 34 and 36 then, See FIG. 1 and FIG. 2, can be viewed as lateral structures that help form an overall operative sturdy rectangular shape for the apparatus 1.

Preferably, after the channels 2 are in position, the filter element 60 is installed. Although the filter element 60 can be positioned and retained within the assembly in any suitable manner, preferably one of the sides is first wedged into one of the support brackets 64, and then the other support bracket 64, along with the other channel 2, is temporarily deflected or bent slightly outwardly so that the other side of the filter can be pushed up into position. Among many alternative methods, the components can be assembled by doing nothing to the support brackets 64 and channels 2, but instead bending (arched or otherwise deformed) slightly at the center of the filter 60, so that the filter can be wedged into position along the seats 66 of the support brackets 64. The preferred filter element 60 completely "filters" airflow from the duct through vent 14 (in direction 46). Slidable panels 50 are installed next. Similar to the filter, the panels 50 are preferably temporarily bent slightly at their center points so that they can be wedged into position and engagement with the seats or lower lip 8. As indicated above, the preferred panels 50 and dampers 10 are slidably adjustable to accommodate the needs and comfort of the occupant or occupant in the area of the air duct.

FIG. 5 is an exploded view of an alternative embodiment of the support brackets or mounting means 64 and the filter element 60. FIG. 6 is an isometric view of the same components as in FIG. 5. In the embodiment of FIGS. 5 and 6, the channels 2 are similarly attached to the ceiling rails via clip elements 68. In that embodiment, filter element 60 would preferably merely rest along the seats instead of being wedged into the support brackets 64. In such an arrangement, some small percentage of the exhaust air might be more likely to pass around the filter (i.e., not get filtered) than with the "wedged" embodiment shown in FIGS. 4 and 7. FIG. 7 is a cross-sectional view of the apparatus 1 taken from FIG. 4. As earlier discussed, the preferred embodiment of apparatus 1 includes various channels and brackets in tongue and groove arrangements. Preferably, the two elongated channels 2 are symmetrically identical to one another. For purposes of this disclosure and description, only one of the channels therefore needs to be discussed. At the outer edge of the preferred channel 2 are upper and lower lips or tongues 70 to engage lips 16 of the damper 10. The support bracket 64 is similarly engaged with the channel 2. The upper seat 76 works in tandem with the lower lip 65 on the support bracket 64 to engage the channel 2 about the channel surface 78 and the groove 74. The clip element 68, as shown, is provided to clip onto the T-bar of the adjacent respective ceiling rail (such as rail 30 or 32, FIG. 1). Also shown in the background is the stop member 52, with its downwardly protruding portion 53. The filter element 60 is also shown engaged along the seat 66 of the support bracket 64. Below the seat 66 is the slidable panel 50, resting along the other seat 8 of the elongated channel 2.

In the preferred embodiment, the apparatus 1, shown installed in FIG. 1 and FIG. 2, can be readily used in an after market retrofit of existing air ducts. That is, where flow control and/or contaminants are problematic, the apparatus 1 may be purchased and installed in conjunction with existing structure and vents. The apparatus 1 is configured to fit under an existing vent and attach to the existing ceiling rails. The preferred apparatus 1 has clipping mechanisms such as grooves 68, discussed elsewhere herein, to clip onto the T-bar of the ceiling rails 30 and 32.

Figure 8:
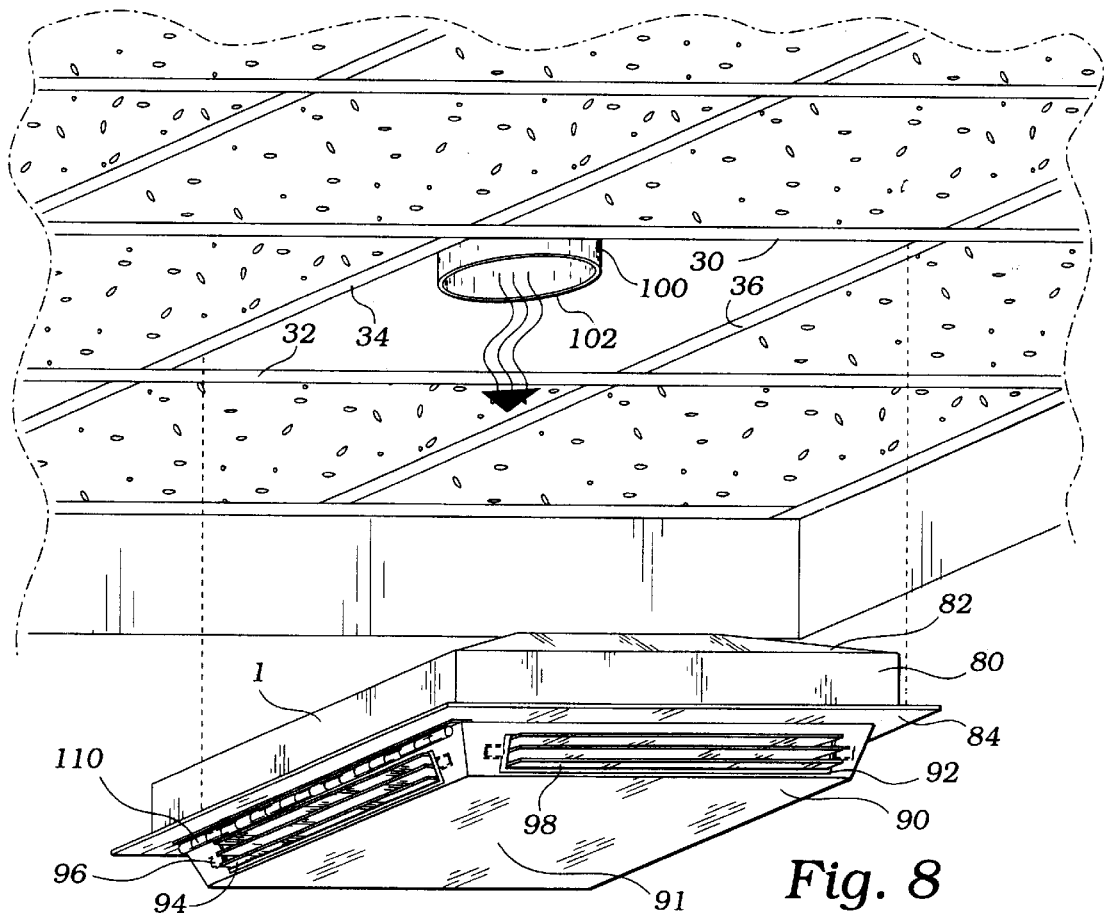
FIG. 8 is an isometric view of an alternative embodiment of the invention.

FIG. 8 illustrates one of the many alternative embodiments of the invention. The embodiment of FIG. 8 is especially useful for new installations, although it can be used to retrofit existing structures and ducting. As illustrated, the apparatus 1 includes a plenum 80 and a diffuser 90. The plenum 80 is shown as having four distinct sides and tapering inward at the top 82, although persons of ordinary skill in the art will understand that any suitable configuration can be utilized. Although not shown, the top 82 of the plenum preferably includes circular knock-outs of varying diameters and/or locations on the top 82. The knockouts are typically perforated patterns in the top 82, preferably provided in at least one diameter. Persons of ordinary skill in the art will understand that these knock-outs are useful during installation, in that an appropriate size knock-out (of the same or approximate diameter 102 as the duct 100) can be removed from the top 82 to engage with (or otherwise accommodate or attach to) the duct 100.

Figure 9:
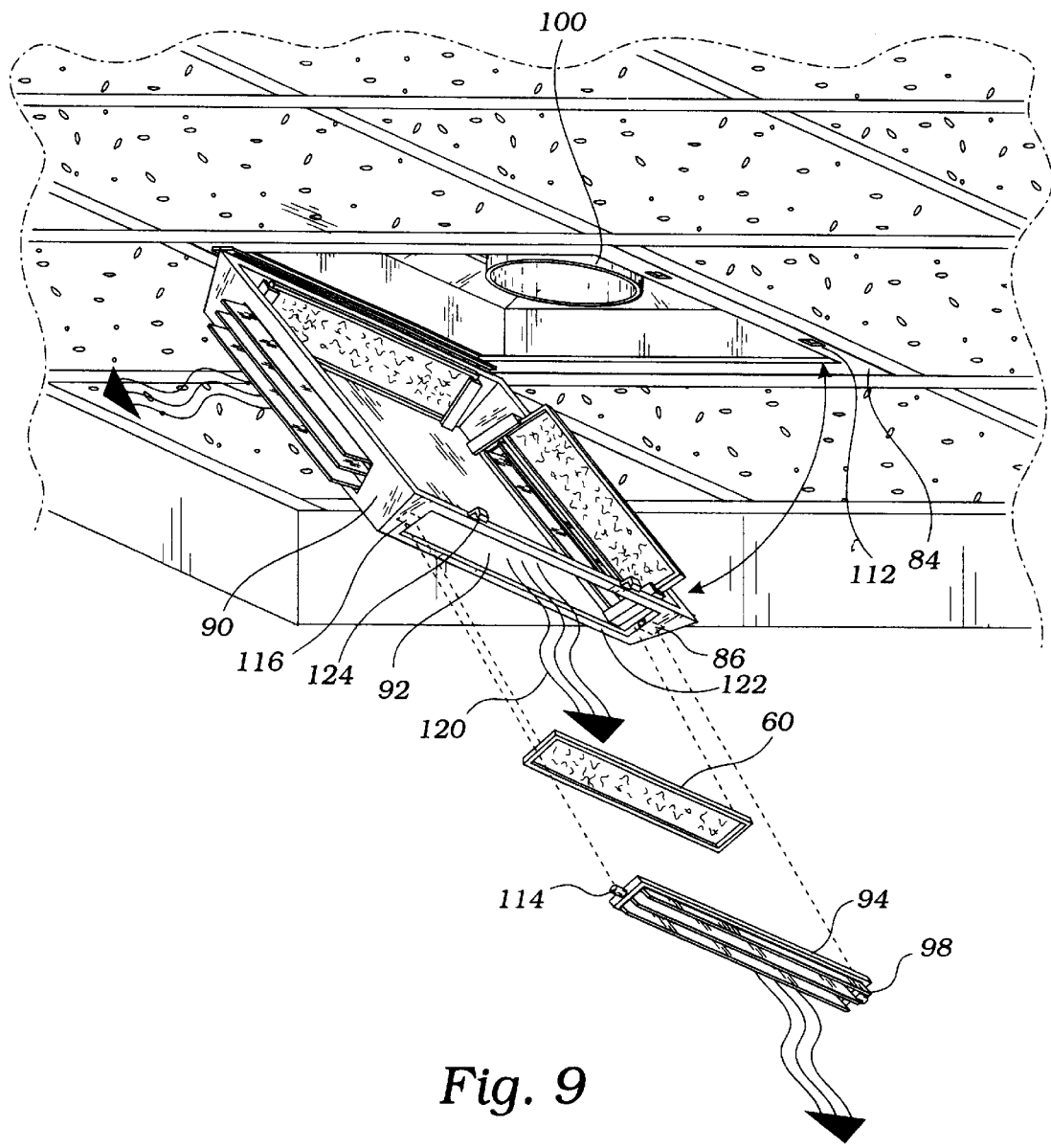
FIG. 9 is similar to FIG. 8, and illustrates in a partially exploded isometric view the alternative embodiment of FIG.

Preferably, the duct 100 terminates at the knock-out line and does not protrude into the plenum interior. Persons of ordinary skill in the art will understand that other arrangements can be employed without departing from the spirit of the invention. When installed, the preferred apparatus of FIGS. 8 and 9 seats above the ceiling line, between rails 30, 32, 34, and 36, resting on the flange or mounting means 84. A diffuser 90 preferably protrudes downward, into the interior environment. The preferred diffuser includes four distinct sides 96, each side preferably having a regulating vent 92 and a vent regulator 94. In the embodiment of FIGS. 8 and 9, each vent regulator 94 is shown with at least one vane 98. Preferably, a plurality of vanes (three vanes per vent regulator 94 are illustrated) better regulates air flow (by providing a more focussed air flow). Preferably, the vanes 98 pivotally connect to the vent regulator 94 and the vent regulator 94 pivotally connects to the regulating vent.

The diffuser 90 and the plenum 80 are preferably attached to one another on one side by a hinge 110 (although multiple hinges may also be used) and on the other side by a locking means. Preferably, the locking means is a latch and lever arrangement (as further discussed in FIG. 9). However, persons of ordinary skill in the art will understand that other frictional or locking or detent means for temporarily engaging the diffuser 90 with the plenum 80 may be readily utilized without deviating from the spirit of the invention.

Although the diffuser 90 is depicted as having a generally flat surface 91, the diffuser 90 may be provided concave upward, in the direction of the plenum, to create an optical illusion that the apparatus 1 is not protruding as far downwardly as it really is. For such concave embodiments, the surface 91 preferably is provided with a concave center point with sloping lines running to each of the corners of the diffuser 90.

In the embodiment of FIGS. 8 and 9, the apparatus includes separate filter elements 60 for each of the regulating vents 92. Alternatively, a single filter element (not shown) would be equally effective if the filter is positioned so that air flow first goes through the filter before it exits the separate vents 92. The preferred multiple filter elements 60 are positioned directly adjacent to each of the vents 92 via filter clips 86. Preferably, the filters 60 and the clips 86 are in frictional engagement with one another.

Preferably, each vent regulator 94 includes a pair of generally round pegs 114 for pivoting the vent regulator 94 and for connecting the vent regulator 94 to the diffuser 90, via engagement with the vent sockets 116. The pivoting action of the vent regulator 94, with respect to the diffuser 90 permits the occupant to direct the flow 120 along several planes. For further adjustability, the vanes 98 can be provided so as to be pivotable with respect to the vent regulator 94. In the alternative embodiment, the vanes 98 may be fixed and only the vent regulator be pivotable.

Preferably, the diffuser 90 hingedly opens from the plenum (and permits access to the interior thereof) by pulling down along the edge 122 of the diffuser 90 opposite the hinge. The diffuser may be locked into position, as shown in the example, via one or more latches 112 along the flange 84 and corresponding levers 124 along the diffuser.

As indicated above, the duct may terminate at the knock-out. In such embodiments, the duct 100 would not protrude into the plenum as shown in FIG. 9.

Included in the many alternative embodiments of the invention not shown is modifying the mounting means of the apparatus to work with horizontal vents, such as are common in residential dwellings.

Although the preferred embodiment of the invention has been described with some specificity, the description and drawings set forth herein are not intended to be delimiting, and persons of ordinary skill in the art will understand that various modifications may be made to the embodiments discussed herein without departing from the scope of the invention, and all such changes and modifications are intended to be encompassed within the appended claims.

What is claimed is:

1. Air discharge apparatus for controlling airflow and reducing air borne contaminants, including:
   mounting means for mounting said apparatus to receive air from a discharge vent;
   at least two regulating vents, said vents positioned generally within two or more separate planes; and
   at least one filter element for reducing air borne contaminants, said filter element positioned in the air flow path of said discharge apparatus, wherein said filter element includes at least one separate filter device positioned in the flow path of each of said regulating vents.

2. The apparatus of claim 1, said at least two regulating vents including at least one regulating vent located along a generally vertical surface of said apparatus and further including at least one regulating vent along a bottom surface of said apparatus.

3. The apparatus of claim 2, wherein said vent located along a generally vertical surface is configured to direct discharge air flow generally horizontally, and said regulating vent along a bottom surface is configured to direct discharge air flow generally vertically.

4. Air discharge apparatus for controlling airflow and reducing air borne contaminants, including:
   mounting means for mounting said apparatus to receive air from a discharge vent;
   at least two regulating vents, said vents positioned generally within two or more separate planes; and
   at least one filter element for reducing air borne contaminants, said filter element positioned in the air flow path of said discharge apparatus, further including at least one slidable damper adjacent to at least one of said regulating vents for controlling air flow therethrough; said apparatus further including at least one slidable panel for controlling air flow through another of said regulating vents.

5. The apparatus of claim 4, further including at least one stop member configured to limit movements of said slidable damper and said slidable panel, said stop member comprising two portions generally perpendicular to each other, a first of said portions affixed to the remainder of said apparatus and the second of said portions extending interferingly into the path of movement of both said slidable damper and said slidable panel.

6. The apparatus of claim 5, further including filter elements adjacent each said vent.

7. The apparatus of claim 1, including a plenum to receive the output of said discharge vent, and a diffuser at the outlet of said plenum, said diffuser including said at least two regulating vents.

8. The apparatus of claim 7, further including independent vent controllers for each of said regulating vents to regulate flow through said regulating vents.

9. The apparatus of claim 8, wherein said vent controllers each include a frame rotatably mounted in said diffuser and at least one baffle rotatably mounted in said frame.

10. The apparatus of claim 7, said diffuser further including four sides and a center portion, said regulating vents being positioned along said sides.

11. Air discharge apparatus for controlling airflow and reducing air borne contaminants, including:
   mounting means for mounting said apparatus to receive air from a discharge vent;
   at least two regulating vents, said vents positioned generally within two or more separate planes; and
   at least one filter element for reducing air borne contaminants, said filter element positioned in the air flow path of said discharge apparatus, including a plenum to receive the output of said discharge vent, and a diffuser at the outlet of said plenum, said diffuser including said at least two regulating vents, said diffuser further including four sides and a center portion, said regulating vents being positioned along said sides, wherein said center portion is generally concave in the direction of the plenum.

12. The apparatus of claim 7, further including connection knockouts in said plenum for allowing said plenum to be fitted on a range of discharge vents.

13. Air discharge apparatus for controlling airflow and reducing air borne contaminants, including:
   mounting means for mounting said apparatus to receive air from a discharge vent;
   at least two regulating vents, said vents positioned generally within two or more separate planes; and
   at least one filter element for reducing air borne contaminants, said filter element positioned in the air flow path of said discharge apparatus, including a plenum to receive the output of said discharge vent, and a diffuser at the outlet of said plenum, said diffuser including said at least two regulating vents, including a hinge mechanism acting between said diffuser and said plenum to permit access into said plenum.

14. Apparatus for regulating a discharge vent of an HVAC system, said apparatus including: a plenum for receiving the flow from said discharge vents; a diffuser with a plurality of regulating vents for directionally controlling flow as it exits said plenum, said diffuser protruding from a surface in which said apparatus is mounted, said plurality of regulating vents being positioned in a non-planar relationship to each other about said protruding portion of said diffuser, in which said protruding portion of said diffuser is pivotably connected to said plenum to permit access into said plenum.

15. Apparatus for regulating a discharge vent of an HVAC system, said apparatus including: a plenum for receiving the flow from said discharge vents; a diffuser with a plurality of regulating vents for directionally controlling flow as it exits said plenum, said diffuser protruding from a surface in which said apparatus is mounted, said plurality of regulating vents being positioned in a non-planar relationship to each other about said protruding portion of said diffuser, further including at least one filter element adjacent each of said regulating vents.

16. The apparatus of claim 14 or 15, further including vent controllers at each of said regulating vents for directionally controlling the flow from the respective regulating vent.

* * * * *